US007987152B1

(12) United States Patent
Gadir

(10) Patent No.: US 7,987,152 B1
(45) Date of Patent: Jul. 26, 2011

(54) FEDERATION OF CLUSTERS FOR ENTERPRISE DATA MANAGEMENT

(76) Inventor: Omar M. A. Gadir, Sunnyvale, CA (US)

( * ) Notice: Subject to any disclaimer, the term of this patent is extended or adjusted under 35 U.S.C. 154(b) by 432 days.

(21) Appl. No.: 12/286,919

(22) Filed: Oct. 3, 2008

(51) Int. Cl.
*G06F 9/00* (2006.01)
(52) U.S. Cl. .................. 707/602; 707/971; 718/105
(58) Field of Classification Search .......... 707/795, 707/802, 803, 812, 966, 971, 602; 718/100, 718/105
See application file for complete search history.

(56) References Cited

U.S. PATENT DOCUMENTS

| | | | |
|---|---|---|---|
| 6,826,580 B2 | 11/2004 | Harris et al. | |
| 6,973,654 B1 * | 12/2005 | Shutt et al. | 718/105 |
| 7,260,579 B2 * | 8/2007 | Keith, Jr. | 707/737 |
| 7,337,170 B2 * | 2/2008 | Lee et al. | 1/1 |
| 7,457,236 B2 * | 11/2008 | Cheng et al. | 370/220 |
| 7,516,221 B2 * | 4/2009 | Souder et al. | 709/226 |
| 7,859,544 B2 * | 12/2010 | Okada | 345/581 |
| 2004/0006578 A1 * | 1/2004 | Yu et al. | 707/201 |
| 2005/0038835 A1 * | 2/2005 | Chidambaran et al. | 707/203 |
| 2006/0048157 A1 | 3/2006 | Dawson et al. | |
| 2006/0230044 A1 | 10/2006 | Utiger | |
| 2006/0230405 A1 * | 10/2006 | Fraenkel et al. | 718/104 |
| 2007/0282856 A1 | 12/2007 | Mueller et al. | |
| 2008/0032739 A1 * | 2/2008 | Hoodbhoy et al. | 455/556.2 |
| 2008/0036781 A1 | 2/2008 | Okada | |

OTHER PUBLICATIONS

McLeod and Heimbigner, "A Federated Architecture for Information Management", ACM Transactions on Information Systems (TOIS), vol. 3, Issue 3 (Jul. 1985), pp. 253-278.

* cited by examiner

*Primary Examiner* — Angela Lie

(57) ABSTRACT

The present invention provides a federation of clusters for uniform and consistent enterprise-wide data management. The federation is an affiliation of clusters, dispersed over different locations that provide a comprehensive solution to the management of all types of data stored in different devices. Each cluster owns data sources connected to the same network it is attached to. Devices connected to the network, and the cluster for managing data accessible through the network constitute an autonomous area. Results from different locations are consolidated to produce unified results and reports. The enterprise-wide data management allows enterprises to validate compliance with federal regulations and insures that data management objectives are being met in all departments within an organization. In addition to enterprise-wide data management, a member cluster of a federation can perform data management local to its autonomous area and execute policies formulated for that area.

16 Claims, 8 Drawing Sheets

FEDERATION OF CLUSTERS FOR ENTERPRISE DATA MANAGEMENT

BACKGROUND OF THE INVENTION

The invention relates to a federation of clusters dispersed over different locations for enterprise data management.

A cluster is a group of servers and other resources working together to provide services for clients. The servers are referred to as nodes. Nodes typically consist of one or more instruction processors (generally referred to as CPUs), disks, memory, power supplies, motherboards, expansion slots, and interface boards. In a master-slave design, one node of the system cluster is called the master or primary server and the others are called the slave, or secondary servers. The master and slave nodes are connected to the same networks, through which they communicate with each other and with clients. Both kinds of nodes run compatible versions of software.

A federation is a loosely coupled affiliation of enterprise data access and management systems that adhere to certain standards of interoperability. Members of a federation are interconnected via a computer network, and may be geographically decentralized. Since such members of a federation remain autonomous, a federated system is a good alternative to the sometimes daunting task of merging together several disparate components. The interoperability resolves problems due to variations in hardware, operating systems, software, data access, data representation, and semantics of interface modules and commands. There are various implementations of federation. A federated database system is a type of database management system, which transparently integrates multiple autonomous database systems into a single federated database. A data grid, which enables users to collaborate, by processing and sharing data across heterogeneous systems, utilizes federation-based data access.

McLeod and Heimbigner published one of the first papers to define federated database architecture. The paper is entitled, "A Federated Architecture for Information Management", ACM Transactions on Information Systems (TOIS), Volume 3, Issue 3 (July 1985), pages 253-278. The paper describes a federated database architecture in which a collection of independent database systems are united into a loosely coupled federation in order to share and exchange information. The federation consists of components (of which there may be any number) and a single federal dictionary. The components represent individual users, applications, workstations, or other components in an office information system. The federal dictionary is a specialized component that maintains the topology of the federation and oversees the entry of new components. Each component in the federation controls its interactions with other components by means of an export schema and an import schema. The export schema specifies the information that a component will share with other components, while the import schema specifies the non-local information that a component wishes to manipulate. The federated architecture provides mechanisms for sharing data, for sharing transactions, for combining information from several components, and for coordinating activities among autonomous components.

The idea of using data grid federation to simplify management of globally distributed data came into existence in the late nineties. Data grids provide interoperability mechanisms needed to interact with legacy storage systems and legacy applications. A logical name space is needed to identify files, resources, and users. In addition there is need to provide consistent management of state information about each file within the distributed environment. These capabilities enable data virtualization, the ability to manage data independently of the chosen storage repositories. Data federation has been used to provide applications with standardized access to integrated views of data. Data grid federation has been utilized for data publication, data preservation and collection across different research institutions and enterprises. There are three types of data grid federations. The first is peer-to-peer grid where each node in the grid is aware of every other node, and can access the data attached to that node. Nodes can access data without having any knowledge of where that data is physically located. The second is hierarchical grids, which follows the master-slave paradigm. All files in slave data grids are replicated from the master grid. The third is replication grids in which two independent data grids serve as back-up sites for each other.

Enterprise data management is the development and execution of policies, practices and procedures that properly manage enterprise data. Some aspects of data management are: security and risk management, legal discovery, Storage Resource Management (SRM), Information Lifecycle Management (ILM) and content-based archiving. In addition, some companies have their own internal management policies. Another aspect of data management is data auditing. Data auditing allows enterprises to validate compliance with federal regulations and insures that data management objectives are being met.

Security and risk management is concerned with discovery of sensitive data like Social Security number (SSN), credit card number, banking information, tax information and anything that can be used to facilitate identity theft. It is also concerned with enforcement of corporate policies for protection of confidential data, protection of data that contains customer phrases and numeric patterns and compliance with federal regulations. Some of the federal regulations that are related to security and risk management are: FRCP (Federal Rules of Civil Procedure), NPI (Non-Public Information) regulation, etc. Legal discovery refers to any process in which data is sought, located, secured, and searched with the intent of using it as evidence in a civil or criminal legal case. Legal discovery, when applied to electronic data is called e-Discovery. SRM is the process of optimizing the efficiency and speed with which the available storage space is utilized. ILM is a sustainable storage strategy that balances the cost of storing and managing information with its business value. It provides a practical methodology for aligning storage costs with business priorities. ILM has similar objectives to SRM and is considered an extension of SRM. Content-based archiving identifies files to be archived based on business value or regulatory requirements. It enables policy driven and automated file migration to archives based on file metadata and content, enables intelligent file retrieval, and it locks and isolates files in a permanent archive when that is required by federal regulations.

Data management is based on data classification, sometimes referred to as categorization. Categorization of data is based on metadata or full text search. Categorization rules specify how data is classified into different groups. For instance, documents categorization could be based on who owns them, their size and their content. Metadata consist of information that characterizes data. Sometimes it is referred to as "data about data". Data categorization methods, based on metadata, group data according to information extracted from its metadata. A few examples of such information are: the time a document was last accessed, its owner, its type and its size. Categorization based on full text utilizes search technology. Full text search is used to identify documents that contain specific terms, phrases or combination of both. The result of the search is used to categorize data.

In addition to categorization, data management involves formulation of policies to be applied to classified data. For example, policies could be encrypting sensitive data, auditing data, retaining data, archiving data deleting data, modifying data access and modifying read and write permissions. There is a long list of data management policies. Policies could be enterprise-wide policies to be applied on all organizations across an enterprise, or departmental level policies to be applied on specific departments within an enterprise.

Part of data management is creation of data management reports. Reports could cover storage utilization, data integrity, duplicated data and results of executing compliance and internal policies. In some implementations, categorization rules, policies, results of data management and report definition files are stored in a database. Report definition files contain instructions that describe report layout for reports generated from a database.

Enterprise data is stored in different devices attached to a network. Data exists in file servers, email servers, portals, web sites, databases, archives, and in other applications. There are three types of enterprise data. Structured data, which is a set of one or more data records with a fixed field structure that is defined by an external data model, for instance database. Semi-structured data, which a set of one or more data records with a variable field structure that can be defined by an external data model, for instance emails and instant messages. Unstructured data, which is a set of one or more data records that have no externally defined field structure. This comprises the majority of documents or files (Microsoft words, Excel, Power Point, etc.). Unstructured data currently accounts for 80 percent of a company's overall data. It is desirable for companies to have transparent enterprise-wide management methods for all data types.

In companies that have data stored in different geographical locations, in some cases on different continents, many aspects of data management are done locally. Some applications provide global data management systems that span different geographical locations. Such applications only deal with data stored in databases, ignoring unstructured data, which contains the bulk of an organization's information.

There is need for transparency in managing all data, dispersed over different geographical location and stored in different devices. Data managed should include the three types: structured, unstructured and semi-structured to ensure full implementation of enterprise-wide management policies for regularity compliance, security and risk management, legal discovery, SRM, ILM and content-based archiving. Sensitive issues like data privacy and confidentiality, identity theft protection should cover all data in all locations.

SUMMARY OF THE INVENTION

In general, in one aspect, the invention provides a federation of two or more autonomous clusters distributed across different geographical areas. Each cluster has one or more servers, referred to as nodes. One of the nodes is the master node and the rest are the slave nodes. A cluster performs management of enterprise data, which is stored in different devices attached to the same network to which the nodes are connected. The master node distributes the workload between the slave nodes. Each node has computer programs and methods for operating such systems, and methods for discovering and managing enterprise data. Nodes communicate with each other and access enterprise data through computer network. The master node has a database for storing results of data management. Each node in a cluster runs software that extracts metadata from enterprise data, and includes a search engine for full text search.

Each node has methods to discover data sources connected to the network, accesses the data, perform data categorization and stores the results in the database. Categorization is based on metadata and full text search. Each data category is assigned a unique tag. A user can specify policies to be applied to tagged categories. Policies ensure data protection, data privacy and confidentiality, legal discovery, data archiving, security and risk management, identity theft protection, storage optimization, data auditing, Information Lifecycle Management and compliance with data reporting laws and regulations. Results of the data management are stored in the database.

Companies that have more than one network can install a cluster at each network. Each cluster is autonomous and owns data located at the network it is connected to. It manages that data and stores the result in the database, which is in the cluster. Devices connected to the network, and the cluster for managing data accessible through the network constitute an autonomous area.

The invention provides methods enabling a group of clusters to form a federation to provide enterprise-wide management of data in different locations. The same data management policies are applied to all data dispersed across different networks. In such a federated data management system, one cluster is the master cluster and the others are the slave clusters. The master cluster is at the location where results of enterprise-wide data management are stored and reports are generated.

When forming a federation the first step is to configure one cluster as the master cluster and other clusters as slave clusters. In a federation, the master node in the master cluster provides the slave clusters with rules to categorize data and policies compatible with the enterprise-wide data management objectives. In a federation, each cluster is responsible for managing data in the network it is attached to and storing the results in its own database. The master node in the master cluster accesses the databases in the slave clusters and consolidates the results of data management to produce enterprise-wide results. It stores the consolidated results of data management in the master cluster database. It also generates reports on enterprise-wide data management.

In one aspect of the invention, all databases in a federation are homogeneous and have the same federation schema. This provides uniform access to data management results stored in different databases within the federation. The federation schema is maintained in the master node of the master cluster. Whenever the federation schema is modified, it is replicated across the federation. To facilitate integration of reports generated by the slave clusters, standard report definitions are created and maintained in the master node of the master cluster. Whenever report definitions are modified they are replicated to the slave clusters.

In general, in another aspect of the invention, federated clusters are installed in one location, in the same geographical area. This is done when a single cluster cannot manage all the data stored at that location. More than one cluster are installed and the load is shared between them.

In general, in another aspect of the invention, federated clusters are installed in one location, where two or more networks in that location are autonomous and one cluster exists in each autonomous network.

In general, in another aspect of the invention, instead of a federation consisting of cluster members, the federation consists of single node members.

In general, in another aspect of the invention, heterogeneous databases are used for storing the results of data management, instead of homogeneous databases.

In general, in another aspect of the invention, any slave node in a federation can be used to create environment for uniform and consistent enterprise-wide data management, instead of being created by the master node in the master cluster.

In general, in another aspect of the invention, results of enterprise data management could be consolidated in any cluster instead of the master cluster in the federation.

In general, in another aspect of the invention, the database for storing results of data management is attached to a slave node in a cluster instead of being attached to the master node.

In general, in another aspect of the invention, a distributed database in a cluster is used for storing the results of data management.

In general, in another aspect of the invention, one or more external databases, accessible to nodes in a cluster, are used for storing results of data management.

In general, in another aspect of the invention, one or more external databases, accessible to all nodes in a federation, are used to store results of data management.

In general, in another aspect, the invention provides systems, programs, and methods where a master node in a cluster performs load balancing with slave nodes within the same cluster In general, in another aspect of the invention, the master node in the master cluster gathers information about the infrastructure of the slave clusters and their topology.

In general, in another aspect of the invention, the process of adding slave nodes to a federation is automated. After a cluster is configured as the master of a federation, instead of manual configuration of slave clusters, clusters that want to join the federation know the location of the master cluster and send a request to join the federation.

In one aspect of the invention, after configuring a master cluster of a federation, clusters that want to join the federation discover the master node of the master cluster using multicast discovery and send requests to join the federation.

BRIEF DESCRIPTION OF THE DRAWINGS

Like reference symbols in the various drawings indicate like elements.

DETAILED DESCRIPTION

Figure 1:
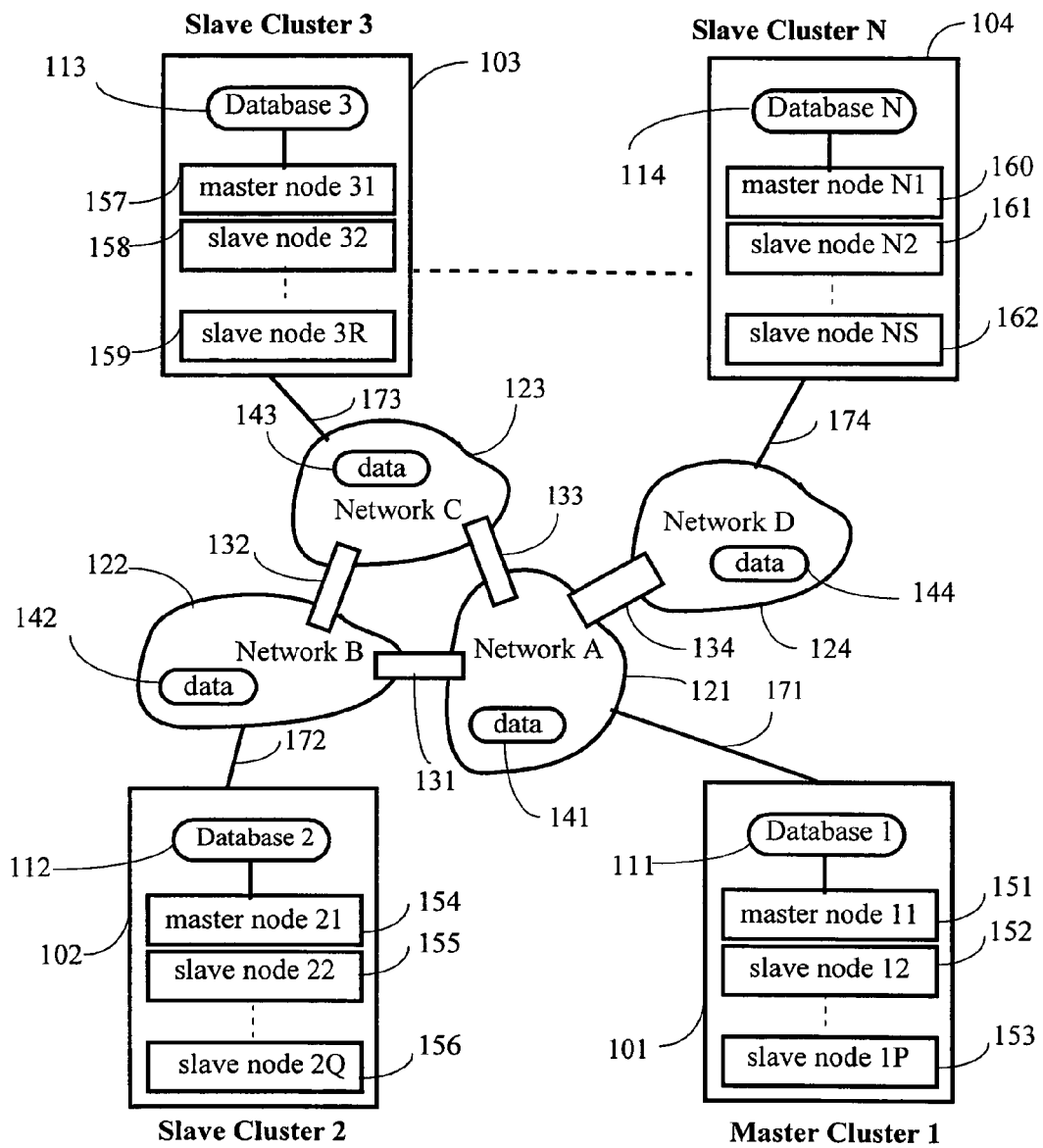
FIG. 1 is a block diagram of a federation of clusters for enterprise data management.

FIG. 1 illustrates the components of a federation of clusters for enterprise data management in accordance with the invention. The federated system consists of N clusters. One of the N clusters is the master cluster and the rest are the slave clusters. Each cluster within the federation consists of two or more nodes, one of the nodes is the master node and the rest are the slave nodes.

Master Cluster 1, labeled 101, has P nodes. It consists of master node 11, labeled 151, slave node 12, labeled 152, . . . , and slave node 1P, labeled 153. Master node 11 has database 1, labeled 111. Slave Cluster 2, labeled 102, has Q nodes. It consists of master node 21, labeled 154, slave node 22, labeled 155, . . . , and slave node 2Q, labeled 156. Master node 21 has database 2, labeled 112. Slave Cluster 3, labeled 103, has R nodes. It consists of master node 31, labeled 157, slave node 32, labeled 158, . . . , and slave node 3R, labeled 159. Master node 31 has database 3, labeled 113. Slave Cluster N, labeled 104, has S nodes. It consists of master node N1, labeled 160, slave node N2, labeled 161, . . . , and slave node NS, labeled 162. Master node N1 has database N, labeled 114.

Link 171 connects Master Cluster 101 to Network A, labeled 121. Data 141 is stored in devices attached to Network 121. Link 172 connects Slave Cluster 102 to Network B, labeled 122. Data 142 is stored in devices attached to Network 122. Link 173 connects Slave Cluster 103 to Network C, labeled 123. Data 143 is stored in devices attached to Network 123. Link 174 connects Slave Cluster 104 to Network D, labeled 124. Data 144 is stored in devices attached to Network 124. A network connection labeled 131 connects Network 121 to Network 122. A network connection labeled 132 connects Network 122 to Network 123. A network connection labeled 133 connects Network 123 to Network 121. A network connection labeled 134 connects Network 121 to Network 124. In practice, the network connections are based on routers attached to different locations in the networks.

A node in a cluster can act as either a master or a slave. There is only one master node; the rest of the nodes are slave nodes. The master node coordinates activities of the slave nodes and assigns data management jobs to them. The master node monitors the loading of slave nodes to identify nodes that are less loaded than others. This information is used to perform load balancing. The master and slave nodes are connected to the same network, through which they communicate with each other and with devices connected to the network. Some of the devices store enterprise data. Such devices include, but not limited to, network file systems, databases, email servers, intranets, data archives and applications. Nodes within a cluster access enterprise data and perform data management. Data management includes, but not limited to, data access, data categorization, execution of management policies, and data auditing to insure that data management objectives are being met. Data categorization is based on metadata and full text search.

Within a federation there is only one master cluster. The rest of the clusters are slaves. The master cluster is where results of enterprise-wide data management are consolidated, and stored and reports pertaining to consolidated results are generated. The first step in forming a federation is to configure one of the clusters as the master cluster and the other clusters as the slaves. The master node in the master cluster coordinates activities of slave clusters that are members of the federation, in addition to activities of nodes within its own cluster. To coordinate activities of the slave clusters, the master node in the master cluster assigns tasks to the master nodes in the slave clusters. Subsequently, each master node in a slave cluster distributes workload between the slave nodes in the same slave cluster.

Within a federation, all databases that are used for storing results of enterprise data management are homogeneous, in other words they have identical software. A database schema is created in the master node of a master cluster and is replicated to the slave clusters. This schema is referred to as the federation schema. Since the databases within a federation are homogeneous, the federation schema provides uniform access to the databases. An administrator for the federation has control over creation and maintenance of the federation schema.

Whenever a federation schema is modified, it is replicated and synchronized across the federation. Slave member clusters are not allowed to directly modify the federation schema. All changes to federation schema are made in the master node of the master cluster. Also, enterprise-wide report definition files are created in the master node of the master cluster and are replicated to the slave clusters. Report definition files contain instructions that describe report layout for reports generated from a database. The master node in the master cluster replicates report definitions to slave clusters whenever they are modified.

Information needed for enterprise-wide data management is created in the master node of the master cluster and is replicated to slave clusters. This information includes, but not limited to, categorization rules and management policies. This information, the federation schema and report definition files constitute an environment for uniform and consistent enterprise-wide data management. A master node in a slave cluster is responsible for coordinating activities of slave nodes within the same cluster to perform data management in their autonomous area. The data management is based on data replicated from the master node in the master cluster When there is data corruption or when there is a need to rebuild software in a slave cluster; the master node in the slave cluster replicates federation schema, report definition files, enterprise-wide categorization rules and policies from the master node in the master cluster.

Clusters that are members of a federation are autonomous and own data sources connected to the same network they are attached to. Each cluster manages the data it owns and stores results in the homogeneous database in the same cluster. The results of data management are accessible to the master node of the master cluster.

In addition to enterprise-wide data management tasks, a member cluster of the federation performs data management local to its autonomous area and executes policies formulated for that autonomous area.

The master node in the master cluster is used to consolidate tasks related to enterprise-wide data management into a job, set a schedule for the job and assigns the job to the slave clusters for execution at a specific date and time. It also assigns jobs to the slave nodes within the cluster it belongs to. Each job includes, but not limited to, categorization rules to be used in categorizing enterprise data, policies to be executed, data auditing, data types to be managed, whether management is done on all data or a subset of data, and the scheduled date and time for running a job. The data types could be all types of data in the autonomous area or specific types, for instance, restricting data management to Microsoft Word and power point documents. Management jobs also contain information about whether to perform data management on all data stored in the autonomous area or a subset of the data, for instance to perform data management in a specific file system, or directory.

When jobs are completed the master node in the master cluster gets results from slave clusters. The master node in the master cluster consolidates all results obtained from slave clusters with results obtained within the master cluster to generate enterprise-wide data management results and reports.

In addition to enterprise-wide data management jobs, a master node of a cluster is used to create jobs for managing data in the autonomous area the master node belongs to. The jobs include policies formulated for data in the autonomous area. The master node distributes the jobs to the slave nodes in the same cluster. Jobs are executed and results are stored in the database in the same cluster.

The communication between the master node of a master cluster and a master in a slave cluster is bi-directional. All tasks and jobs related to enterprise-wide data management come from the master node in the master cluster. A master node in a slave cluster can request certain services from the master node in the master cluster. Such services include, but not limited to, update categorization rules, update policies, update federation schema, and request to leave and re-join the federation. The updates are needed when a slave cluster experienced data loss or corruption, or subsequent to software upgrades.

Figure 2:
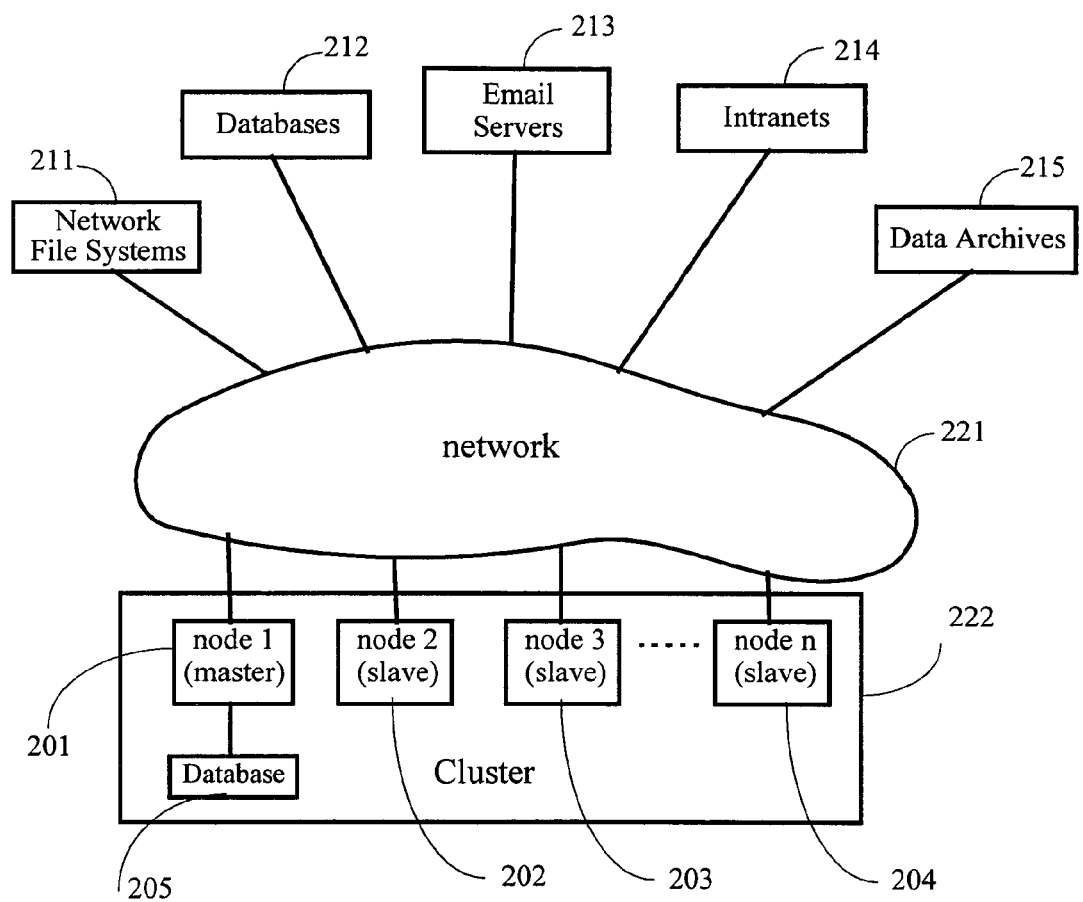
FIG. 2 is a block diagram of a cluster that is a member of a federation.

FIG. 2 shows an embodiment of a cluster that is a member of a federation. The cluster labeled 222, consists of n nodes. Node 1, labeled 201 is the master node. The slave nodes are labeled 202, 203, . . . , and 204. The master node coordinates activities of the slave nodes. All nodes are connected to network 221. Network 221 connects the nodes to data sources. The data sources are network file systems 211, Databases 212, Email Server 213, Intranets 214 and data archives 215. The master node 201 has a database 205 for storing results of data management. The database is accessible to all nodes of the cluster. Nodes access source data and perform data categorization based on metadata and full text search. Nodes apply policies to each category of data and store the results in database 205.

Figure 3:
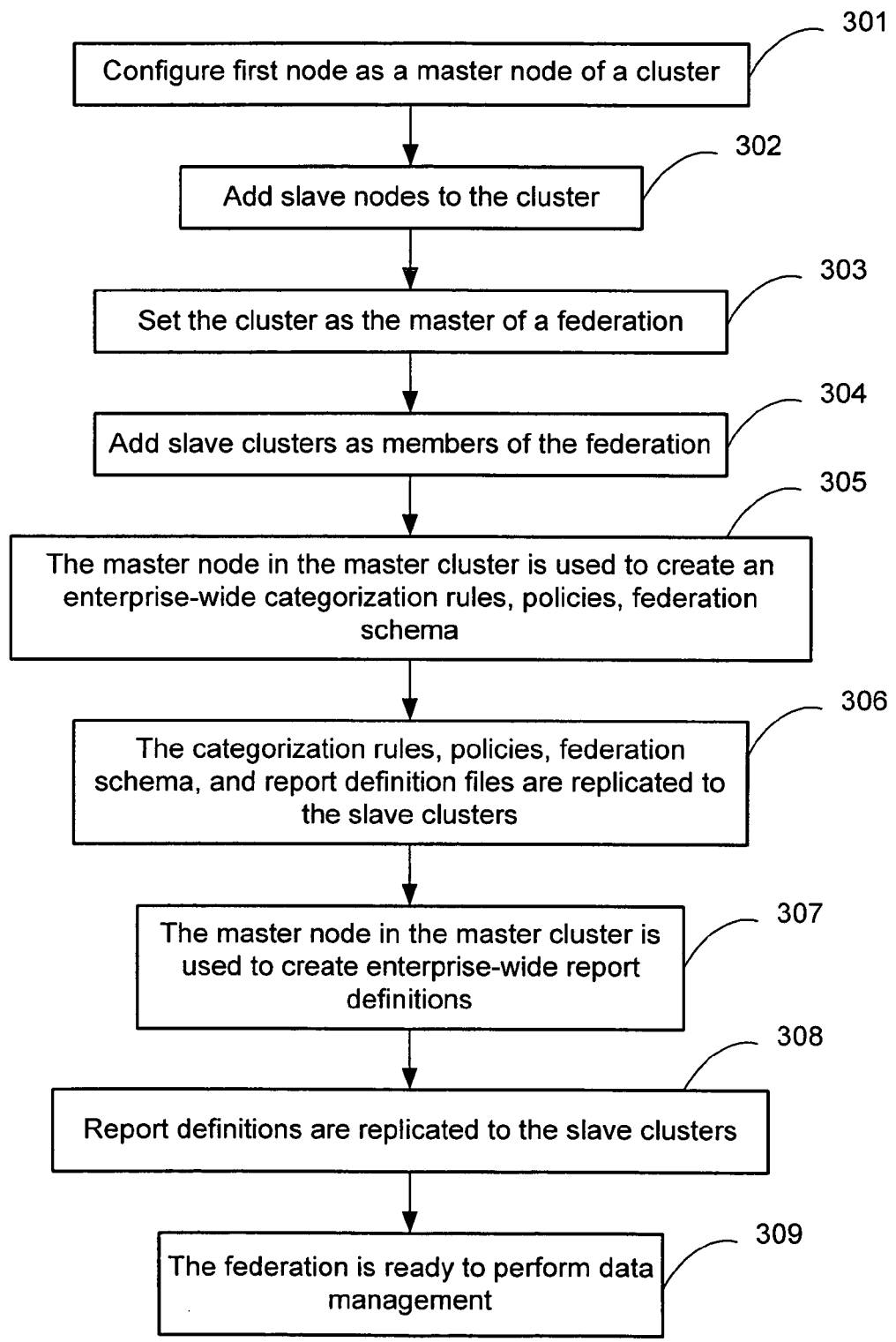
FIG. 3 is a flowchart illustrating initialization of a master cluster.

FIG. 3 is a flowchart illustrating initialization of a master cluster. In step 301, the first node is configured as the master node of a cluster. In step 302 slave nodes are added to the cluster. In step 303, the cluster is set as the master cluster of a federation. In a master cluster, the master node coordinates the activities of the federation. In step 304, slave clusters are added as members of the federation. In step 305, the master node in the master cluster is used to create an enterprise-wide categorization rules, policies, and federation schema. In step 306, the categorization rules, policies and the federation schema are replicated to the slave clusters. In step 307, the master node in the master cluster is used to create enterprise-wide report definitions. In step 308, report definitions are replicated to the slave clusters. In step 309, the federation is ready to perform data management.

Figure 4:
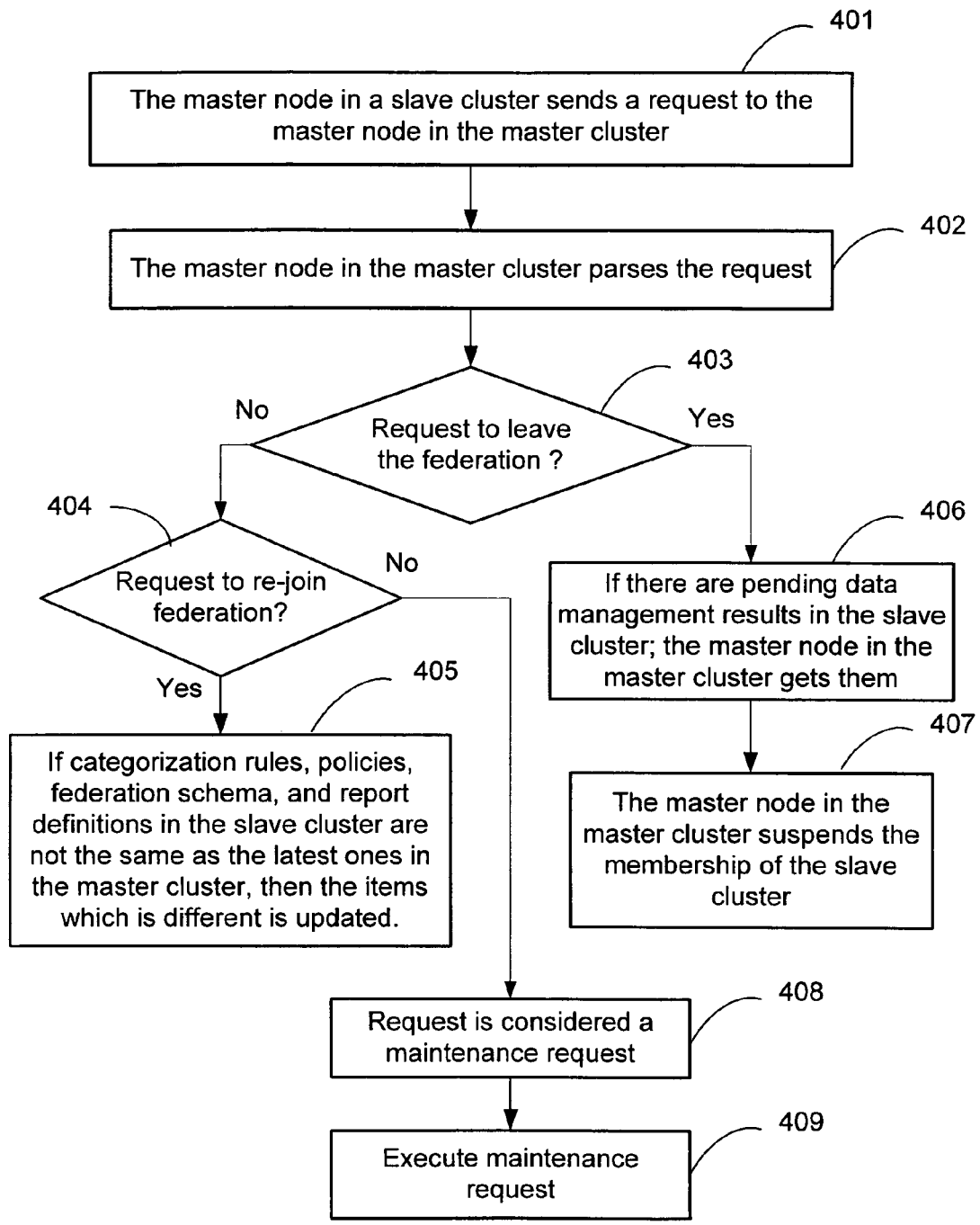
FIG. 4 is a flowchart illustrating processing of requests sent by a master node in a slave cluster.

FIG. 4 is a flowchart illustrating processing of requests sent by a master node in a slave cluster. In this flowchart it is assumed that a master node in a master cluster receives requests from slave clusters that are members of the federation or were members. A slave cluster may have temporarily left a federation for maintenance or failure. If the federation is performing enterprise-wide data management, then the master node of the master cluster has already replicated categorization rules, policies, federation schema, and report definition to the slave clusters.

In step 401, the master node in a slave cluster sends a request to the master node in a master cluster. In step 402, the master node in the master cluster parses the request. In decision step 403, the master node in the master cluster determines whether it is a request to leave the federation. If it is a request to leave the federation, then step 406 is executed. In step 406, if there are pending data management results in the slave cluster; the master node in the master cluster gets them. In step 407, the master node in the master cluster suspends the membership of the slave cluster. If in decision step 403, the request is not to leave the federation, then in decision step 404 it is determined whether it is a request to re-join the federation. If it is a request to re-join the federation, then in step 405, if categorization rules, policies, federation schema, and report definitions in the slave cluster are not the same as the latest versions in the master cluster, then any item which is different is updated. If in decision step 404, the request is not to re-join the federation, then the request is considered a maintenance request (step 408). Maintenance requests include, but not limited to, synchronize categorization rules, policies, federation schema and report definitions. Maintenance requests are executed in step 409.

Figure 5:
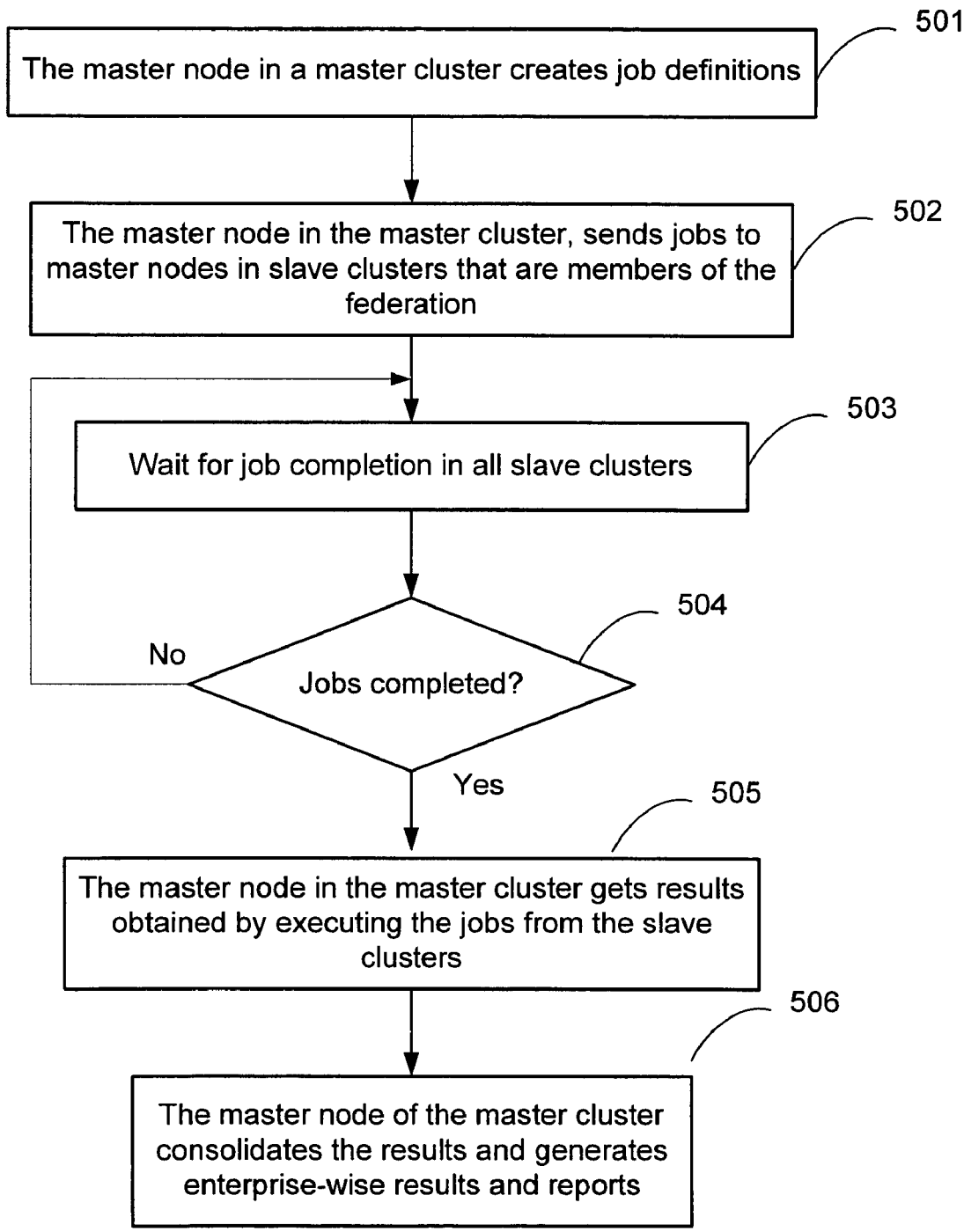
FIG. 5 is a flowchart illustrating how the master node in the master cluster manages enterprise-wide jobs.

FIG. 5 is a flowchart illustrating how the master node in the master cluster manages enterprise-wide jobs. In step 501, the master node in the master cluster creates job definitions for enterprise-wide data management. The job definitions includes, but not limited to, categorization rules, policies to be executed, data auditing, data types to be managed, whether management is done on all data or a subset of data, and the scheduled date and time for running a job. In step 502, the master node in the master cluster, sends jobs to master nodes in slave clusters that are members of the federation. In step 503, the master node in the master cluster waits for job completion in all slayer clusters. In decision step 504, the master node in the master cluster verifies job completion in all slave clusters. If jobs are not completed, the master node of the master cluster continues waiting at step 503. If jobs are completed the master node in the master cluster gets results obtained by executing the jobs from the slave clusters (step 505). In step 506, the master node of the master cluster consolidates the results and generates enterprise-wide results and reports. In some cases consolidation of results is started before all jobs are completed.

Figure 6:
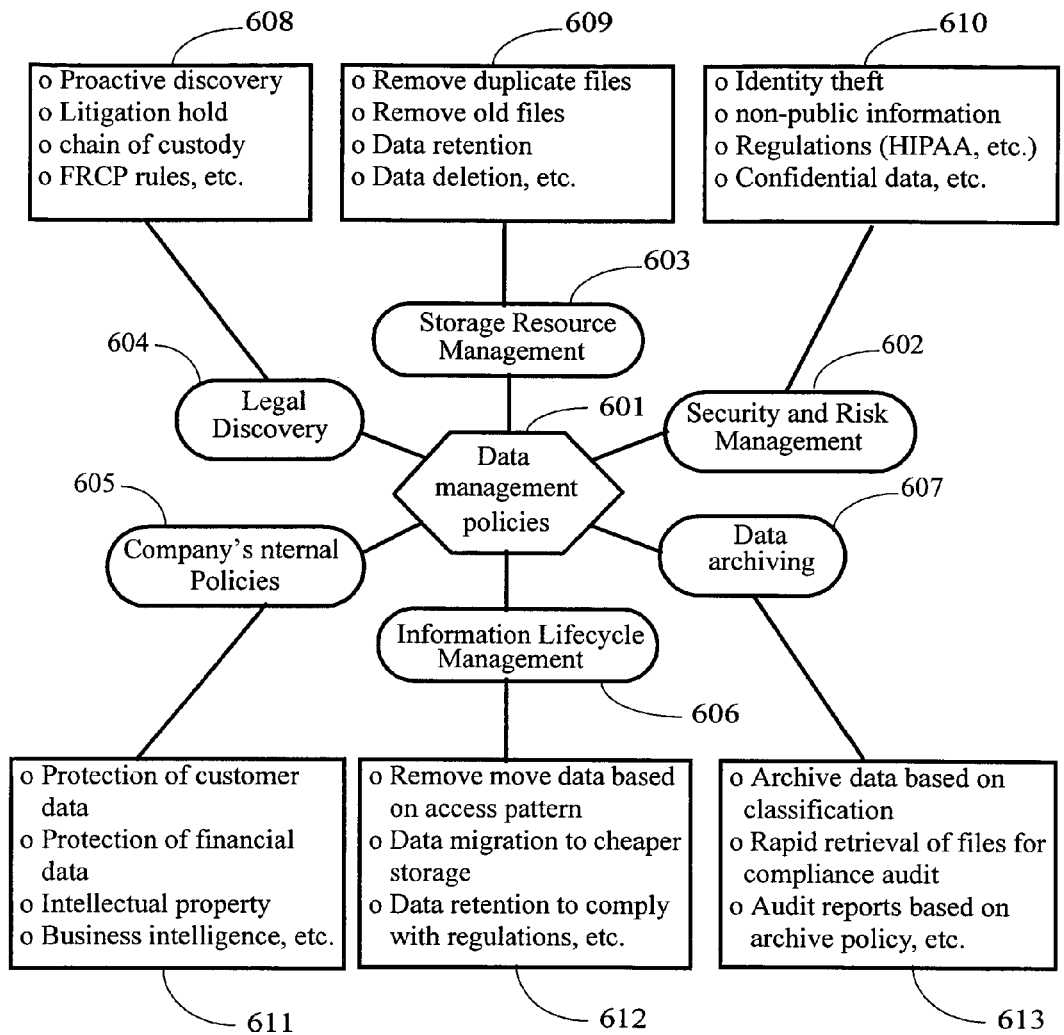
FIG. 6 illustrates the relationship between different management policies.

FIG. 6 illustrates different components of enterprise data management policies. Data management policies (601), includes six types of policies: Security and Risk Management 602, Storage Resource Management 603, Legal Discovery 604, company's Internal Policies 605, Information Lifecycle Management 606 and Data Archiving 607. Each of the six policies consists of sub-policies. For instance, the Security and Risk Management policy (602) includes policies to deal with identity theft, non-public information, federal regulations, confidential data, etc. List 610 shows a sample of policies that are part of Security and Risk Management. Lists of sample policies that are part of Storage Resource Management, Legal Discovery, Company's Internal policies, Information Lifecycle Management and Data Archiving are shown in 609, 608, 611, 612 and 613 respectively. Within an organization, individuals or teams responsible for data management generate enterprise-wide policies; each policy consists of one or more sub-policies. Within an organization, individuals or teams responsible for data management in an autonomous area formulate other policies to be executed to satisfy the requirements of that autonomous area.

Figure 7:
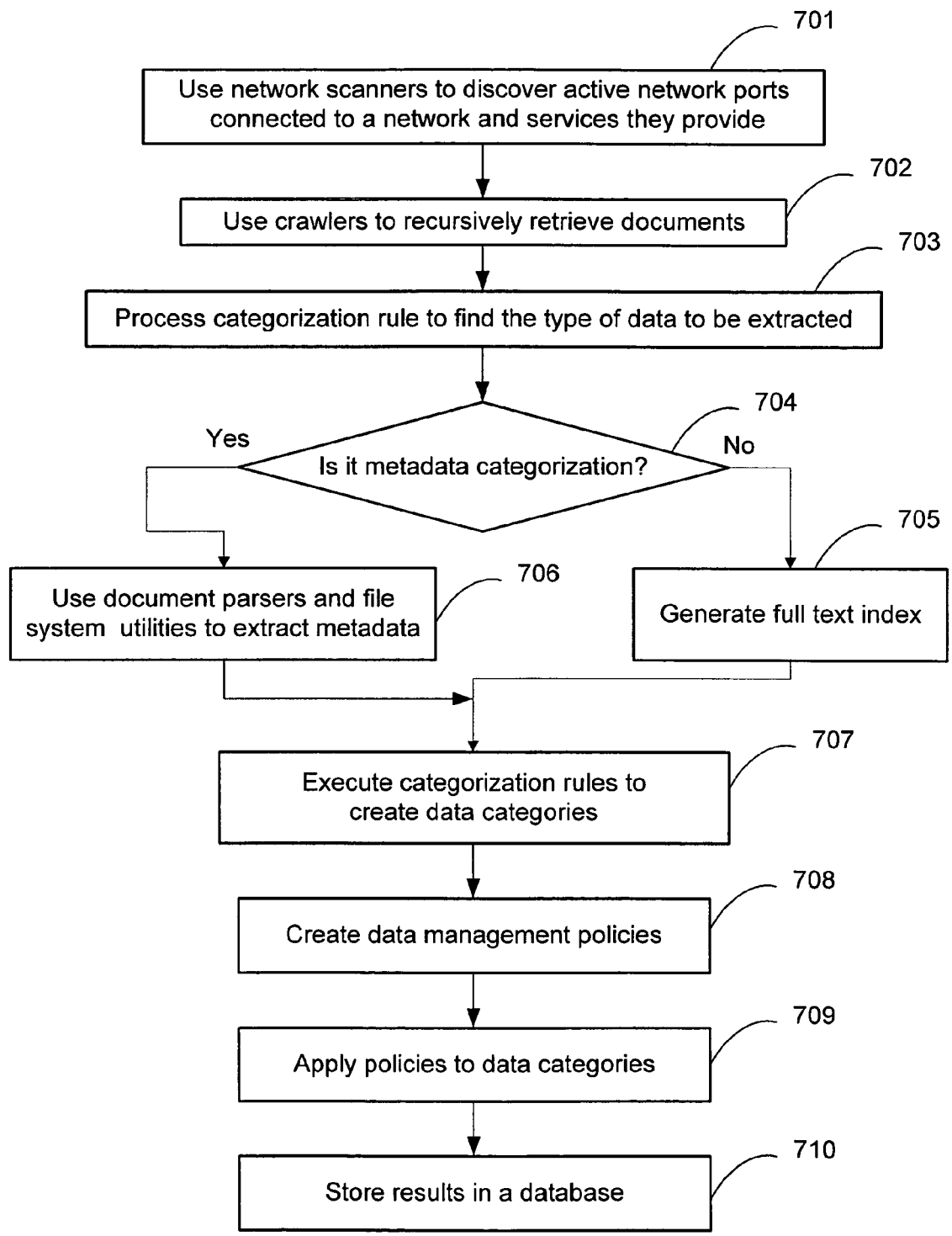
FIG. 7 is a flowchart illustrating steps executed during data management.

FIG. 7 illustrates the steps for an implementation of data management. In step 701 nodes use network scanners to discover active network ports connected to a network and services they provide. This is referred to as data discovery. Results returned by scanners indicate locations where data is stored. In step 702, nodes access the locations where data is stored and use crawlers to recursively retrieve documents. In step 703, nodes process categorization rules to find the type of data to be extracted. In the decision step 704, a node determines whether the categorization rule is based on metadata. If it is based on metadata, step 706 is executed. Here, document parsers and file system utilities are used to extract metadata. If the categorization rule is not based on metadata, step 705 is executed. Here a search engine is used to generate a full text index. In step 707, the categorization rule is executed to create categories of data. Each data category is assigned a unique tag. In step 708, data management policies for different data categories are created. In step 709, policies are applied to the tagged data categories. Executing policies results in actions applied to the target data category. In step 710, data management results are stored in a database. The flowchart shows that policies are created after data is categorized. As there is no dependency between the two, practically, policies could be created earlier.

Figure 8:
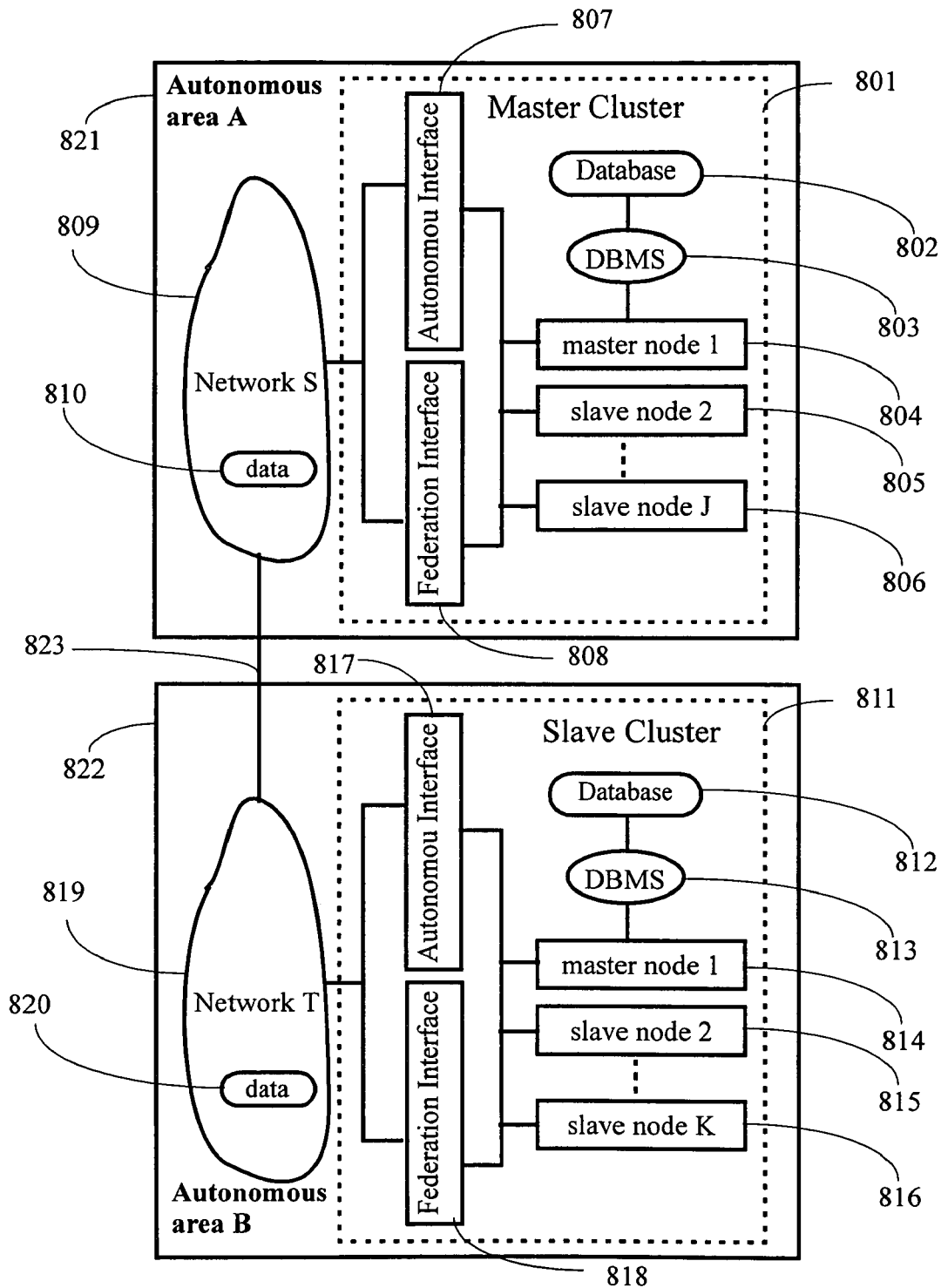
FIG. 8 is an embodiment of the invention based on two federated clusters.

FIG. 8 is an embodiment of the invention, based on a federation of two clusters. One cluster is the master cluster, labeled 801, and the other cluster is a slave cluster, labeled 811. The master cluster 801 consists of J nodes; a master node labeled 804, and slave nodes labeled 805, . . . , and 806. The master node 804 has a database management system (DBMS) labeled 803 and a database labeled 802. A database management system is computer software for storing, modifying and extracting information from a database. Nodes in the cluster 801 are connected to autonomous interface 807 and federation interface 808. The autonomous and federation interfaces are connected to network S, labeled 809. Network S contains data 810 stored in devices attached to it. Data in network S is accessible to nodes in cluster 801. The autonomous area A, labeled 821, encompasses the master cluster 801 and devices connected to the network S.

The slave cluster 811 consists of K nodes; a master node labeled 814, and slave nodes labeled 815, . . . , and 816. The master node 814 has a DBMS labeled 813 and a database labeled 812. Nodes in the cluster 811 are connected to autonomous interface 817 and federation interface 818. The autonomous and federation interfaces are connected to network T, labeled 819. Network T contains data 820 stored in devices attached to it. Data in network T is accessible to nodes in cluster 811. The autonomous area B, labeled 822, encompasses the slave cluster 811 and devices connected to network T. Communication link 823 connects network T to network S. Databases 802 and 812 are homogeneous.

The autonomous interface 807 allows nodes in the master cluster 801 to access components in the autonomous area 821. Federation interface 808 allows nodes in the master cluster 801 to access components in the autonomous area 822. In a typical configuration, only master node 804 has access to the federation interface 808 since it is the node that interacts with the master node 814 in the slave cluster 811.

The autonomous interface 817 allows nodes in the slave cluster 811 to access components in the local autonomous area 822. Federation interface 818 allows nodes in the slave cluster 811 to access components in the autonomous area 821. In a typical configuration, only master node 814 has access to the federation interface 818 since it is the node that interacts with the master node 804 in the master cluster 801.

The master node 804, which runs DBMS 803, creates a federation schema and replicates it to the master node 814, which runs DBMS 813. Since databases 802 and 812 are homogeneous, the federation schema provides uniform access to both databases. The master node 804 assigns enterprise-wide data management jobs to the master node 814 in the autonomous area 822. Master node 814 distributes the enterprise-wide jobs to the slave nodes in cluster 811. Master node 804 also assigns enterprise-wide management jobs to slave nodes in its autonomous area 821. Cluster 811 stores results of enterprise-wide management of data in autonomous area 822 in database 812. Cluster 801 stores results of enterprise-wide management of data in autonomous area 821 in database 802. Master node 804 accesses results of enterprise-wide data management stored in database 812 and consolidates them with results of enterprise-wide database management stored in database 802 to produce unified results. The unified results are stored in database 802.

In addition to enterprise-wide data, master node 804 is used to create jobs for data management in the autonomous area it belong to (821) and distributes the jobs to slave nodes in cluster 801. This enables execution of data management policies specific to the autonomous area 821. Results of the data management are stored in database 802. Also, master node 814 is used to create jobs for data management in the autonomous areas it belongs to (822) and distributes the jobs to slave nodes in cluster 811. This enables execution of data management policies specific to the autonomous area 822. Results of the data management are stored in database 812.

Instead of the federation including two clusters, a master cluster and a slave cluster, shown in FIG. 8, in another embodiment, the federation includes a similar master cluster and more than one similar slave cluster.

In another implementation consistent with the present invention, a job may include requests to get information about data or queries about its content. Such information and queries include, but not limited to, types of data, where data exists, data stored in specific devices, data ownership, data access, data read and write permissions, and queries to find documents that contain certain words, phrases or a combination of both.

In another implementation consistent with the present invention, federated clusters are installed in one location, in the same geographical area. This is done when a single cluster cannot manage all the data stored at that location. More than one cluster is installed and the load is shared between them.

In another implementation consistent with the present invention, federated clusters are installed in one location, where two or more networks in that location are autonomous and one cluster exists in each autonomous network.

In another implementation consistent with the present invention, instead of a federation consisting of cluster members, the federation consists of single node members.

In general, in another aspect, the invention provides systems, programs, and methods, where heterogeneous databases are used for storing the results of data management, instead of homogeneous databases.

In general, in another aspect, the invention provides systems, programs, and methods, where any slave node in a federation can be used to create environment for uniform and consistent enterprise-wide data management, instead of being created by the master node in the master cluster.

In general, in another aspect, the invention provides systems, programs, and methods, where results of enterprise data management could be consolidated in any cluster instead of the master cluster in the federation.

In another implementation consistent with the present invention, the database for storing results of data management is attached to a slave node in a cluster instead of being attached to the master node.

In another implementation consistent with the present invention, a distributed database in a cluster is used for storing the results of data management.

In another implementation, consistent with the present invention, one or more external databases, accessible to nodes in a cluster, are used for storing results of data management.

In another implementation, consistent the present invention, one or more external databases, accessible to all nodes in a federation, are used to store results of data management.

In another implementation, consistent the present invention, the master node in the master cluster gathers information about the infrastructure of the slave clusters and their topology.

In another implementation, consistent the present invention, the process of adding slave nodes to a federation is automated. After a cluster is configured as the master of a federation, instead of manual configuration of slave clusters, clusters that want to join the federation know the location of the master cluster and send a request to join the federation.

In another implementation, consistent the present invention, after configuring a master cluster of a federation, clusters that want to join the federation discover the master node of the master cluster using multicast discovery and send requests to join the federation.

CONCLUSION, RAMIFICATION, AND SCOPE

Accordingly, the reader will see that the present invention provides a federation of clusters for enterprise-wide data management. The federation is an affiliation of clusters, dispersed over different locations that provide a comprehensive solution to the management of all types of data stored in different devices. Results from different locations are consolidated to produce unified results and reports. The enterprise-wide data management allows enterprises to validate compliance with federal regulations and insures that data management objectives are being met everywhere.

While the above description contains several specifics these should not be construed as limitations on the scope of the invention, but rather as examples of the some of the preferred embodiments, thereof. Many other variations are possible. For example, in other embodiments of the system a federation could be an affiliation of single nodes dispersed in different locations, the databases used for storing enterprise results are heterogeneous, instead of being homogeneous, and any node could be used to create enterprise-wide categorization rules, policies and federation schema, not just the master node.

The invention has been described in terms of particular embodiments. Other embodiments are within the scope of the following claims. For example, steps of the invention can be performed to a different order and still achieve desirable results.

What is claimed is:
1. A federation of clusters for enterprise data management comprising:
  two or more clusters, each said cluster installed in a different location, wherein each said cluster comprises:
    a master node; and
    one or more slave nodes;
    wherein said master node coordinates activities and distributes workload to said slave nodes;
  each said cluster has a database for storing results of enterprise data management,
  wherein all databases in each said clusters are homogenous;
  each said cluster connected to a computer network;
  each said computer network contains data stored in devices attached to it;
  each said cluster has access to data stored in devices in the same network said cluster is attached to, wherein each said cluster and said devices is an autonomous area;
  each cluster has methods for managing said data, and storing results of managing said data in said database;
  said networks in said federation are interconnected; and said clusters, wherein one of said clusters is a master cluster and the others are slave clusters.

2. The system of claim 1, further comprising instructions to be executed on each node in a cluster to cause the system to access data, categorize it, apply management policies and store results in a database in said cluster.

3. The system of claim 2, further comprising computer program instructions operable to be executed to cause the system to:
   create and maintain in the master node in the master cluster an environment for uniform enterprise-wide data management, said environment includes, but at least, categorization rules and management policies;
   replicate said environment to slave clusters;
   replicate said environment to said slave clusters whenever said environment is modified;
   create and maintain a federation schema in said master node, said federation schema provides uniform access to databases in clusters that are members of a federation;
   replicate said federation schema to said slave clusters;
   replicate said federation schema to said slave clusters whenever said federation schema is modified;
   create and maintain enterprise-wide report definition files in said master node;
   replicate said enterprise-wide report definition files to said slave clusters; and
   replicate said report definition files to said slave clusters whenever said report definition files are modified.

4. The system of claim 3, further comprising computer program instructions operable to be executed to cause the system to:
   create enterprise-wide data management tasks, said tasks include, at least, data discovery, data categorization, policies to be applied to data categories, data auditing, and generating reports about managed data;
   assign said tasks to clusters that are members of a federation; said clusters execute said tasks, and store results in databases in said clusters;
   consolidate results stored in said databases; and
   generate enterprise-wide data management reports based on said consolidated results.

5. The system of claim 4, further comprising instructions operable to be executed on the master node in the master cluster to:
   coordinate activities of slave nodes in said master cluster and distributes workload between them;
   create enterprise-wide data management tasks and assign said tasks to slave clusters that are members of the federation, assign said tasks to slave nodes in said master cluster, said tasks are executed and results are stored in databases in clusters that are members of the federation;
   consolidate results stored in said databases in clusters that are members of the federation, and store said consolidated results in a database in the master cluster; and
   generate enterprise-wide data management reports based on said consolidated results.

6. The system of claim 4, further comprising computer program instructions operable to be executed on a master node in a slave cluster to:
   distribute workload between the slave nodes in said slave cluster and coordinate their activities; and
   synchronize environment for uniform enterprise-wide data management in said slave cluster with updated versions in the master node in the master cluster.

7. The system of claim 4, wherein in addition to enterprise-wide data management, a cluster that is a member of a federation performs enterprise data management local to its autonomous area, executes policies formulated for said autonomous area and stores results in a database in said cluster.

8. The system of claim 3, further comprising job management computer program instructions operable to be executed on the master node in the master cluster to cause the system to:
   consolidate activities related to enterprise-wide data management into a job, each said job includes, at least, categorization rules to be used in categorizing enterprise data, policies to be executed, data auditing, data types to be managed, scheduled date and time for running said job and whether to perform data management on all data stored in an autonomous area or a subset of said data;
   assigns said job for execution by slave clusters;
   assigns said job for execution by slave nodes in the master cluster said master node belongs to;
   access databases in said slave clusters and database in said master cluster, consolidate results of executing said job into an enterprise-wide data management results; and
   generate enterprise-wide data management reports based on said consolidated results.

9. The system of claim 8, wherein the job management instructions are operable to be executed on a master node in a master cluster to cause the system to:
   create jobs for getting information about data in an autonomous area, such information includes, at least, types of data, where data exists, data stored in specific devices, data ownership, data access and data read and write permissions; and
   create queries to find documents that contain certain words, phrases or a combination of both.

10. The system of claim 8, wherein the job management instructions are operable to be executed on a master node in a cluster to cause the system to:
    create jobs for managing data in an autonomous area said master node belong to;
    said jobs include policies specific to said autonomous area; and
    said jobs are assigned for execution by slave nodes in a cluster said master node belongs to; and store results in a database in said cluster.

11. The system of claim 1, wherein federated clusters can be installed in one location, in the same geographical area.

12. The system of claim 1, wherein a federation of clusters has one or more of the following configurations for homogeneous databases for storing results of data management:
    in each cluster there is a database attached to the master node in said cluster;
    in each cluster there is a database attached to a slave node in said cluster;
    in a cluster there is a distributed database accessible to nodes in said cluster;
    a cluster has one or more databases external to said cluster and accessible to nodes in said cluster; and
    there is one or more databases external to clusters, and accessible to all nodes in said federation.

13. The system of claim 12, wherein heterogeneous databases are used instead of homogeneous databases.

14. The system of claim 1, wherein, instead of a federation consisting of cluster members, the federation consists of single node members.

15. A federation of clusters for enterprise data management, comprising:
    two or more clusters;
    one cluster is the master cluster, and other clusters are slave clusters;

each cluster consists of two or more nodes, a master node, and slave nodes connected to computer network;

the master node in the master cluster has a database management system (DBMS) and a database;

the master node in a slave cluster has a database management system (DBMS) and a database;

each cluster accesses data stored in devices attached to a network to which the cluster is connected to;

said master node in the master cluster assigns enterprise-wide data management jobs to master nodes in the slave clusters; and said master node in the master cluster assigns enterprise-wide data management jobs to slave nodes in the master cluster.

16. The system of claim 15, further comprising computer program instructions operable to be executed to cause the system to manage data accessible to clusters that are members of a federation, store results in databases in said clusters and consolidate said results to generate enterprise-wide data management results and generate reports based on said consolidated results.

* * * * *